US009621543B2

(12) United States Patent
Rubin et al.

(10) Patent No.: US 9,621,543 B2
(45) Date of Patent: *Apr. 11, 2017

(54) INTERCEPTING ENCRYPTED NETWORK TRAFFIC FOR INTERNET USAGE MONITORING

(71) Applicant: The Nielsen Company (US), LLC, Schaumburg, IL (US)

(72) Inventors: Jonathon Brett Rubin, Tampa, FL (US); Jan Besehanic, Tampa, FL (US); Robert Peter Borland, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 175 days.

This patent is subject to a terminal disclaimer.

(21) Appl. No.: 14/561,042

(22) Filed: Dec. 4, 2014

(65) Prior Publication Data
US 2015/0100780 A1    Apr. 9, 2015

Related U.S. Application Data

(63) Continuation of application No. 13/361,651, filed on Jan. 30, 2012, now Pat. No. 8,914,629.

(51) Int. Cl.
*H04L 29/06* (2006.01)
(52) U.S. Cl.
CPC .................................. *H04L 63/0823* (2013.01)
(58) Field of Classification Search
CPC .................. H04L 63/0823; G01B 2210/56
See application file for complete search history.

(56) References Cited

U.S. PATENT DOCUMENTS 5,392,353 A    2/1995  Morales
5,675,510 A    10/1997 Coffey et al.
(Continued)

FOREIGN PATENT DOCUMENTS

WO        9641495        12/1996

OTHER PUBLICATIONS

Abraham, et al., "Performance Monitoring and Analysis," U.S. Appl. No. 60/353,993, submitted on Feb. 5, 2002 (42 pages).
(Continued)

*Primary Examiner* — Matthew Smithers
(74) *Attorney, Agent, or Firm* — Hanley, Flight & Zimmerman, LLC

(57) ABSTRACT

Example methods disclosed herein include intercepting, with a meter executing on a computing device, a request sent by a client application to establish a secure communication session with a network server. Such disclosed example methods also include receiving, at the meter in response to forwarding the request to the network server, a first public key provided by the network server for encrypting a session key, and providing, from the meter to the client application, a second public key associated with the meter instead of the first public key provided by the network server in response to the request being intercepted. Such disclosed example methods further include using the first public key and a private key associated with the second public key to enable the meter to access an unencrypted version of the session key, and monitoring, with the meter, the network traffic using the unencrypted version of the session key.

19 Claims, 8 Drawing Sheets

(56) References Cited

U.S. PATENT DOCUMENTS

| | | | |
|---|---|---|---|
| 6,366,298 | B1 | 4/2002 | Haitsuka et al. |
| 7,089,304 | B2 | 8/2006 | Graham |
| 7,146,505 | B1 | 12/2006 | Harada et al. |
| 7,260,837 | B2 | 8/2007 | Abraham et al. |
| 7,269,259 | B1 | 9/2007 | Fernandez |
| 7,382,881 | B2 | 6/2008 | Uusitalo et al. |
| 7,493,655 | B2 | 2/2009 | Brown |
| 7,502,797 | B2 | 3/2009 | Schran et al. |
| 7,945,779 | B2 | 5/2011 | Martin |
| 8,190,875 | B2 | 5/2012 | Lev Ran et al. |
| 8,200,815 | B1* | 6/2012 | Prasad ............... G06F 11/3476 709/223 |
| 8,914,629 | B2* | 12/2014 | Rubin ............... H04L 63/0823 713/157 |
| 2002/0156836 | A1 | 10/2002 | Janosik, Jr. et al. |
| 2004/0019518 | A1 | 1/2004 | Abraham et al. |
| 2005/0188079 | A1 | 8/2005 | Motsinger et al. |
| 2006/0245590 | A1 | 11/2006 | Brickell |
| 2007/0099634 | A1 | 5/2007 | Chari et al. |
| 2007/0276940 | A1 | 11/2007 | Abraham et al. |
| 2008/0028207 | A1 | 1/2008 | Bolcer et al. |
| 2008/0126794 | A1* | 5/2008 | Wang ............... H04L 63/0823 713/151 |
| 2009/0182668 | A1 | 7/2009 | Lee |
| 2009/0254756 | A1 | 10/2009 | Kawakita |
| 2010/0125729 | A1 | 5/2010 | Baentsch et al. |
| 2010/0223377 | A1 | 9/2010 | Hashimoto |
| 2011/0022704 | A1 | 1/2011 | Duan et al. |
| 2011/0069832 | A1 | 3/2011 | Tang |
| 2011/0231652 | A1 | 9/2011 | Bollay et al. |
| 2011/0314163 | A1* | 12/2011 | Borins ............... H04W 4/005 709/227 |
| 2011/0321139 | A1 | 12/2011 | Jayaraman et al. |
| 2012/0173032 | A1* | 7/2012 | Pamulaparthy ........ G01D 4/002 700/295 |
| 2012/0221955 | A1 | 8/2012 | Raleigh et al. |
| 2012/0323510 | A1* | 12/2012 | Bell ............... H02J 3/14 702/62 |
| 2013/0198512 | A1 | 8/2013 | Rubin et al. |
| 2015/0058916 | A1* | 2/2015 | Rostami-Hesarsorkh H04L 63/1408 726/1 |

OTHER PUBLICATIONS

IT Security Office, "An Analysis of the New Marketscore Proxy," Cornell University Office of Information Technologies, http://www2.cit.cornell.edu/security/marketscore/technical.html, Mar. 31, 2005 (24 pages).

IT Security Office, "Recent Changes in Comscore Proxy Capabilities," Cornell University Office of Information Technologies, http://www2.cit.cornell.edu/security/marketscore/addendum.html, Jun. 6, 2005 (2 pages).

Information Security Office, "Security Alerts: MarketScore Spyware," Stanford University, http://www.stanford.edu/group/security/securecomputing/2005/01/marketscore_spyware.html, Jan. 11, 2005 (2 pages).

"31.5 The IPFILTER (IPF) Firewall," FreeBSD Handbook: Chapter 31 Firewalls, http://www.freebsd.org/doc/handbook/firewalls-ipf.html, accessed on Jan. 30, 2012 (18 pages).

Metz, Cade, "How ComScore Can Track Your Mouse Clicks," The Register, http://www.theregister.co.uk/2008/05/12/inside_comscore/, published in Telecoms, May 12, 2008 (6 pages).

Patent Cooperation Treaty, "The International Search Report and the Written Opinion of the International Searching Authority," issued by the International Searching Authority in connection with PCT application No. PCT/US2012/068474, mailed Mar. 11, 2013 (9 pages).

International Searching Authority, "International Preliminary Report on Patentability", issued in connection with International Application No. PCT/US2012/068474, dated Aug. 5, 2014 (5 pages).

Ardizzone, et al., "A European Framework to Build Science Gateways: Architecture and Use Cases", Jul. 2011, ACM (2 pages).

Claudel, et al., "Minimal Error Certificates for Detection of Faulty Sensors Using Convex Optimization", 2009, IEEE, (pp. 1177-1186).

Goldman, Grigori, "Periodical Payment Model using Restricted Proxy Certificates", Jan. 2007, ACM, vol. 62 (pp. 131-139).

Machiraju, et al., "A Scalable and Robust Solution for Bandwidth Allocation", 2002, IEEE, (pp. 148-157).

United States Patent and Trademark Office, "Non-Final Office Action", issued in connection with U.S. Appl. No. 13/361,651, dated Apr. 22, 2013 (15 pages).

United States Patent and Trademark Office, "Final Office Action", issued in connection with U.S. Appl. No. 13/361,651, dated Nov. 18, 2013 (19 pages).

United States Patent and Trademark Office, "Notice of Allowance", issued in connection with U.S. Appl. No. 13/361,651, dated Aug. 4, 2014 (11 pages).

United States Patent and Trademark Office, "Notice of Allowance", issued in connection with U.S. Appl. No. 13/361,651, dated Nov. 14, 2014 (2 pages).

* cited by examiner

US 9,621,543 B2

INTERCEPTING ENCRYPTED NETWORK TRAFFIC FOR INTERNET USAGE MONITORING

RELATED APPLICATION(S)

This patent arises from a continuation of U.S. patent application Ser. No. 13/361,651 (now U.S. Pat. No. 8,914, 629), which is entitled "INTERCEPTING ENCRYPTED NETWORK TRAFFIC FOR INTERNET USAGE MONITORING" and which was filed on Jan. 30, 2012. U.S. patent application Ser. No. 13/361,651 is hereby incorporated by reference in its entirety.

FIELD OF THE DISCLOSURE

This disclosure relates generally to Internet usage monitoring and, more particularly, to intercepting encrypted network traffic for Internet usage monitoring.

BACKGROUND

Internet usage monitoring generally involves intercepting traffic that is exchanged between a monitored client and one or more content sources to monitor Internet usage associated with the client. For example, HyperText Transfer Protocol (HTTP) traffic that is exchanged between a monitored client, such as a web browser, web app, etc., and a content source, such as a web site, can be intercepted (e.g., at a proxy server) and processed to ascertain which content source(s) (e.g., sites) were visited by the user of the monitored client, which content was retrieved and presented by the monitored client, how the monitored client was used to interact with the content source(s), etc. Prior Internet usage monitoring techniques are able to ascertain such Internet usage characteristics from the intercepted HTTP traffic because HTTP traffic is unencrypted (e.g., plaintext) and, thus, the information conveyed by the HTTP traffic can be readily interpreted and analyzed.

DETAILED DESCRIPTION

Figure 1:
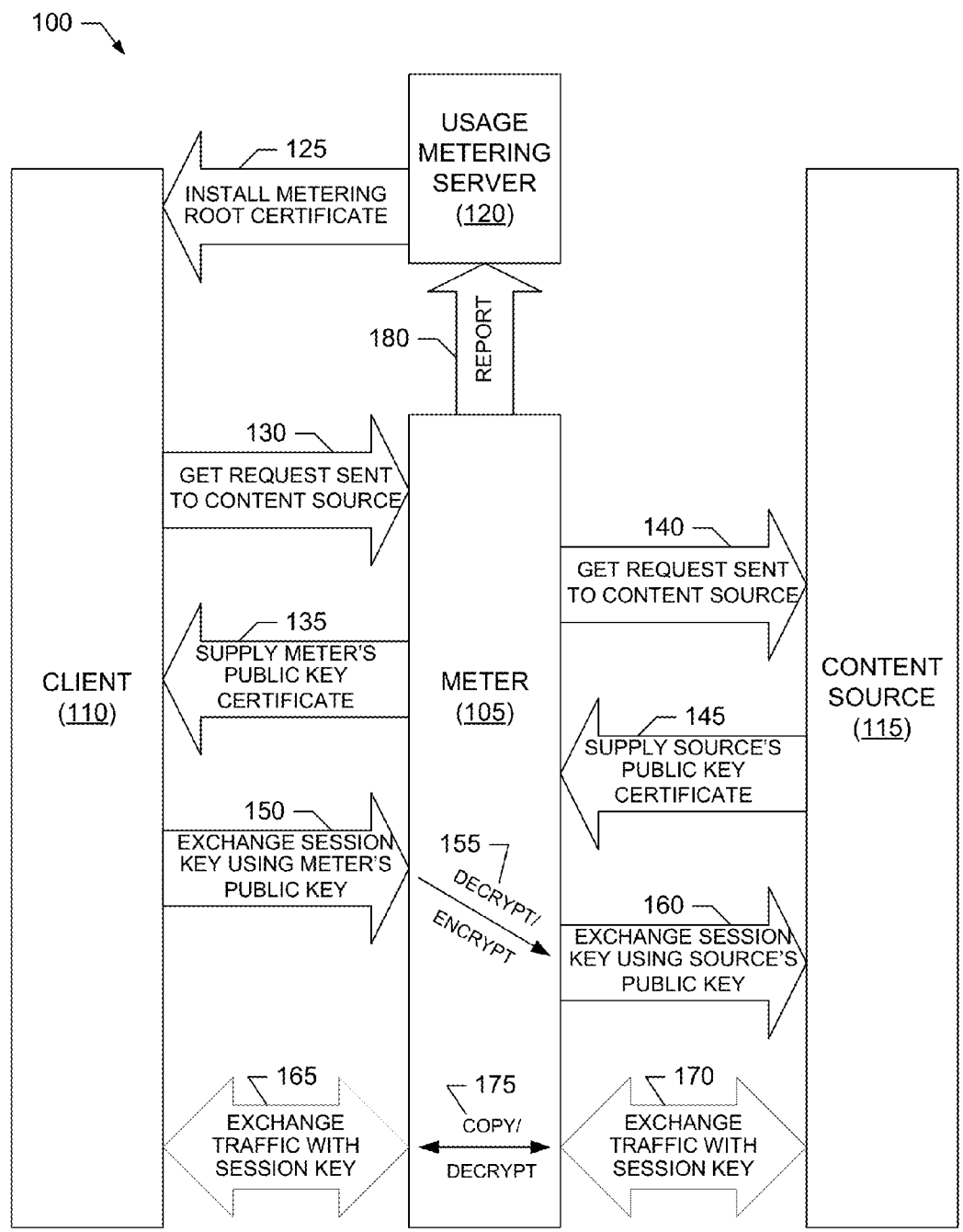
FIG. 1 is block diagram of an example environment of use in which an example meter is able to intercept encrypted network traffic for Internet usage monitoring as disclosed herein.

Methods, apparatus and articles of manufacture for intercepting encrypted network traffic for Internet usage monitoring are disclosed herein. In example methods disclosed herein to monitor Internet usage, an example meter that is to monitor Internet usage associated with a monitored client provides a first certificate to the client in response to intercepting a request sent by the client to a content source. In such example methods, the first certificate is associated with the example meter. The example methods also include the example meter receiving, from the content source, a second certificate, which is associated with the content source, in response to the meter sending the request to the content source. The example methods further include the example meter obtaining a session key to decrypt encrypted traffic exchanged between the content source and the client to monitor Internet usage. In the example methods, the session key is obtained by the example meter from the client based on the first certificate and is sent by the meter to the content source based on the second certificate.

In such example methods, the client sends the request to the content source to initiate establishment of a secure communication session over which encrypted network traffic can be exchanged between the client and the content source. The client expects to receive a digital certificate from the content source (referred to herein as the source's digital certificate) that authenticates the content source and provides a ciphering key to be used to establish the secure communication session. However, the example meter intercepts the request and provides, to the client, a different digital certificate (referred to herein as the meter's digital certificate) that is associated with the meter, not the content source, and that includes a ciphering key known by the meter. In parallel, the example meter also sends (e.g., forwards) the intercepted request to the content source, and receives the source's digital certificate from the content source.

In such example methods, the client is unaware that the digital certificate it receives is provided by the meter and not the content source. As such, the client proceeds to use the ciphering key (e.g., public key) included in the meter's digital certificate to send a reply to the content source that contains ciphering information, such as a symmetric session key, to establish the secure communication session. The example meter is able to intercept this reply containing the session key and/or other ciphering information sent by the client because the meter knows the ciphering key (e.g., public key) used by the client and/or the meter knows a companion ciphering key (e.g., a private key paired with the public key) capable of decrypting data that is encrypted using the ciphering key included in the meter's digital certificate. In the example methods, the example meter decrypts the ciphering information (e.g., session key) included in the reply intercepted from the client, re-encrypts the ciphering information (e.g., session key) using the ciphering key (e.g., public key) included in the source's digital certificate, and sends (e.g., forwards) the client's reply (re-encrypted using the ciphering key from the source's digital certificate) to the content source to establish the secure communication session. In this way, the example meter is able to insert itself into a secure communication session established between the monitored client and the content source, and is able to obtain the session key and/or other ciphering information, which can be used by the meter to decrypt and monitor the encrypted traffic exchanged between the client and the content source.

More specifically, some example methods further include the example meter intercepting a reply, from the client, containing the session key. In the intercepted reply, the session key is encrypted using a first public key included in the first certificate (e.g., the meter's digital certificate). In such examples, the example meter decrypts the session key using a first private key associated with the first public key to obtain the session key. The example meter also encrypts the session key using a second public key, where the second public key was included in the second certificate (e.g., the source's digital certificate). The example meter further sends the session key, encrypted using the second public key, to the content source to establish a secure communication session (e.g., encrypted data connection) between the content source and the client.

Some example methods include the example meter intercepting first encrypted traffic received from the content source and being sent to the client, and decrypting the first encrypted traffic using the session key to obtain first decrypted traffic to be used to monitor Internet usage. In some examples, the meter additionally or alternatively intercepts second encrypted traffic received from the client and being sent to the content source, and decrypts the second encrypted traffic using the session key to obtain second decrypted traffic to be used to monitor Internet usage In some examples, the client corresponds to a client application that is to execute on a client device. In such examples, the meter can be implemented by or otherwise associated with the client device. For example, the meter can include an example meter application that is to execute on the client device (e.g., in an application space of the client device), and an example kernel extension that is to execute in an operating system kernel of the client device. In such examples, the kernel extension can be used to intercept information being sent by and/or to the monitored client, and the meter application can be used to process the intercepted information to, for example, monitor Internet usage associated with the client. In some examples, the meter is implemented by a proxy server in communication with the client and the content source. In some examples, the first certificate (e.g., the meter's digital certificate) described above is verifiable using a first root certificate issued by a provider of the meter, and the second certificate (e.g., the source's digital certificate) is verifiable using a second root certificate issued by a trusted certificate authority different from the provider of the meter.

As mentioned above, prior Internet usage monitoring techniques that intercept HTTP traffic are able to ascertain Internet usage characteristics from the intercepted HTTP traffic because HTTP traffic is unencrypted. However, due to privacy and security concerns, secure communications sessions, such as HTTP Secure (HTTPS) sessions, are increasingly being used to exchange network traffic over the Internet. Prior monitoring techniques that rely on intercepting unencrypted HTTP traffic are unable to decrypt the encrypted traffic exchanged between clients and content sources via HTTPS sessions and, thus, are unable to monitor Internet usage for clients that support and employ HTTPS. Unlike such prior monitoring techniques, Internet usage monitoring involving intercepting encrypted network traffic as disclosed herein can decrypt the encrypted traffic exchanged between clients and content sources via HTTPS and/or other secure communication sessions, thereby enabling Internet usage of a client to be more fully and accurately monitored.

Turning to the figures, FIG. 1 illustrates a block diagram of an example environment of use 100 in which an example meter 105 is to intercept encrypted network traffic to enable Internet usage associated with an example client 110 to be monitored as disclosed herein. The meter 105 of the illustrated example intercepts encrypted traffic exchanged between the client 110 and an example content source 115 to, for example, monitor Internet and/or other online usage of the client 110 by a user (which is collectively referred to herein as Internet usage monitoring). In the illustrated example, the meter 105 reports Internet usage monitoring results to an example usage metering server 120.

The client 110 included in the example environment 100 of FIG. 1 can correspond to any type of client application, client device, etc., capable of exchanging network traffic with a content source, such as the content source 115. For example, the client 110 can correspond to a client device, such as a personal computer, a tablet computer, a mobile phone (e.g., a smart phone, a cell phone, etc.), a personal digital assistant (PDA), a media device (e.g., such as a set-top box, a digital video recorder, a personal video recorder, etc.), etc. In some examples, the client 110 corresponds to a particular client application executing on a client device. For example, the client 110 can correspond to a client application, such as a web browser, a media player, a web application (also referred to as a web app or app), etc., executing on any type of client device.

The content source 115 included in the example environment 100 of FIG. 1 can correspond to any type(s) or number of content sources. For example, the content source 115 can correspond to a web site implemented by a web server, an on-demand server providing video-on-demand (VOD) and/or other on-demand content, a streaming content provider, an enterprise server, etc. The usage metering server 120 included in the example environment 100 of FIG. 1 can correspond to any type(s) or number of servers, facilities, repositories, etc., for receiving Internet usage monitoring reports.

In the environment 100 of the illustrated example, the meter 105 inserts itself into a secure communication session established between the monitored client 110 and the content source 115, and obtains a session key and/or other ciphering information that is used to exchange encrypted traffic between the client 110 and the content source 115. The meter 105 then uses the obtained session key and/or other ciphering information to decrypt and monitor the encrypted traffic exchanged between the monitored client 110 and the content source 115. The decrypted network traffic and/or results of processing the decrypted network traffic are then reported by the meter 105 to the usage metering server 120. Block diagrams illustrating example implementations of the meter 105 are provided in FIGS. 2-4, which are described in greater detail below.

In the illustrated example environment 100 of FIG. 1, the meter 105 operates to monitor Internet usage associated with the client 110 in the following manner. In an example initialization operation 125, a root digital certificate is installed for later use by the client 110 when authenticating a digital certificate to be provided, during a later operating stage, by the meter 105. For example, the root digital certificate installed in the initialization operation 125 may be installed on the operating system (OS) of the client 110 (e.g., when the client 110 corresponds to a client device), or on an OS of a client device executing the client 110 (e.g., when the client 110 corresponds to a particular application executing on the device), using any root certificate installation mechanism. A root certificate is generally a trusted certificate obtained from a trusted certificate authority, which can then be used to authenticate other digital certificates provided by other entities, such as the content source 115, and which contain ciphering keys (e.g., public keys) to be used to establish secure communication sessions with those entities. In the illustrated example environment 100, the meter 105 will cause its own digital certificate, instead of the digital certificate of the content source 115, to be provided to the client 110, as described in greater detail below. Accordingly, in the example operation 125 of FIG. 1, after a user associated with the client 110 has consented to monitoring of the client 110 by a monitoring entity, the usage metering server 120 (or another server or download mechanism associated with the monitoring entity) provides a root certificate (referred to herein as a metering root certificate) that is capable of authenticating the meter's digital certificate. The metering root certificate is then installed for later use by the client 110.

After the metering root certificate is installed, the meter 105 can then begin monitoring Internet usage associated with the monitored client 110. For example, in an example operation 130, the meter 105 intercepts a first HTTPS GET request sent by the client 110 to the content source 115 to request establishment of a secure communication session. The client 110 expects to receive a digital certificate (referred to herein as the source's digital certificate or the source's certificate) from the content source 115 to be used in establishing the secure communication session. However, in an example operation 135, the meter 105 instead returns its own digital certificate (referred to herein as the meter's digital certificate or the meter's certificate) to the client 110, which treats the meter's digital certificate as if it was the source's digital certificate received from the content source 115. Accordingly, the client 115 will attempt to authenticate the meter's digital certificate as if it was the source's digital certificate, and authentication will be successful (e.g., the meter's digital certificate will be determined to be valid) due to the installation of the metering root certificate in the initialization operation 125. For example, the meter's digital certificate may indicate that it can be authenticated using the metering root certificate, and the client 110 will detect that the metering root certificate is installed and, thus, use the metering root certificate to authenticate the meter's digital certificate.

Additionally, in response to intercepting the GET request in operation 130, the meter 105 sends (e.g., forwards, re-sends, etc.) the GET request to the content source 115 in an example operation 140. The second GET request sent in operation 140 may be the same or different from the first GET request received in operation 130. For example, sending the second GET request in operation 140 may involve forwarding the first GET request received from the client 110 in operation 130, or quashing the GET request received in operation 130 and creating a new GET request containing similar or different information, or a combination thereof, for sending to the content source 115 in operation 140. In response to the GET request sent in operation 140, the content source 115 returns the source's digital certificate, which is intercepted and stored by the meter 105 in an example operation 145. As illustrated in the example of FIG. 1, the operations 140 and 145 can overlap (e.g., occur in parallel with) the operation 135. Alternatively, the operations 140 and 145 can occur before or after the operation 135.

In the illustrated example environment 100, the meter's digital certificate and the source's digital certificate each include respective public keys to be used to encrypt ciphering information, such as a session key, that is to be conveyed to a recipient for use in encrypting traffic, such as HTTPS traffic, to be exchanged with the recipient. Furthermore, in the illustrated example, the client 110 believes that the meter's digital certificate is actually the server's digital certificate. Accordingly, in the environment 100, after the client 110 authenticates the meter's digital certificate, the client 110 uses the public key included in the meter's digital certificate to encrypt a symmetric session key (and/or other ciphering information) to be used to encrypt and decrypt traffic exchanged between the client 110 and the content source 115. Then, as a reply to receiving what it believes was the source's digital certificate (but that was actually the meter's digital certificate), the client 110 sends the encrypted session key (and/or other ciphering information) to the content source 115 in a reply message.

However, the meter 105 intercepts this reply message sent from the client 110 in an example operation 150. In an example operation 155, the meter 105 decrypts the encrypted session key (and/or other ciphering information) using a private key known by the meter 105 and associated (e.g., paired) with the public key included in the meter's digital certificate. In the example operation 155, the meter 105 also re-encrypts the session key (and/or other ciphering information) using the public key included in the source's digital certificate received in the operation 145. The meter 105 then sends the re-encrypted session key (and/or other ciphering information) to the content source 115 in an example operation 160. The content source 115 is able to use its private key, which is associated (e.g., paired) with the public key included in the source's digital certificate, to decrypt and obtain the session key originally provided by the client 110. In this way, the meter 105 learns the symmetric session key (and/or other ciphering information) to be used to exchange encrypted network traffic, such as HTTPS traffic, between the client 110 and the content source 115.

In the illustrated example environment 100 of FIG. 1, the meter 105 uses the session key (and/or other ciphering information) obtained in the example operation 155 to decrypt and monitor encrypted network traffic, such as HTTPS traffic, exchanged between the client 110 and the content source 115. In the example of FIG. 1, blocks 165 and 170 represent the encrypted network traffic exchanged between the client 110 and the client source 115. In an example operation 175, the meter 175 intercepts and copies the encrypted network traffic exchanged between the client 110 and the client source 115. The meter 105 also decrypts the copied, encrypted network traffic using the symmetric session key (and/or other ciphering information) learned in the operation 155. In an example operation 180, the meter 105 reports the decrypted network traffic and/or results of processing the decrypted network traffic to the usage metering server 120.

In some examples, the example meter 105 of FIG. 1 can also monitor unencrypted (e.g., plaintext) network traffic, such as HTTP traffic, exchanged between the client 110 and the content source 115. In the case of monitoring unencrypted traffic, the meter 105 intercepts and copies the unencrypted traffic exchanged between the client 110 and the content source 115. Because the traffic is unencrypted, the meter 105 can directly report the unencrypted network traffic and/or results of processing the unencrypted network traffic to the usage metering server 120.

As can be seen from the illustrated example of FIG. 1, the meter 105 is able to insert itself into the secure communication session between the client 110 and the content source 115 without altering the existing operation/functionality of the client 110 or the content source 115. In other words, the operation of the meter 105 is transparent to the client 110 and the content source 115.

Although the example environment 100 of FIG. 1 includes one client 110 and one content source 115, the meter 105 can be used to intercept encrypted traffic between any number of client(s) 110 and content source(s) 115 to monitor Internet usage associated with the client(s) 110. For example, the meter 105 can monitor multiple client applications 110 executing on a client device and exchanging network traffic with multiple content sources 115. Also, the meter 105 is not limited to intercepting HTTPS encrypted traffic, but can be used to intercept traffic encrypted using any type(s) or number of ciphering techniques.

Figure 2:
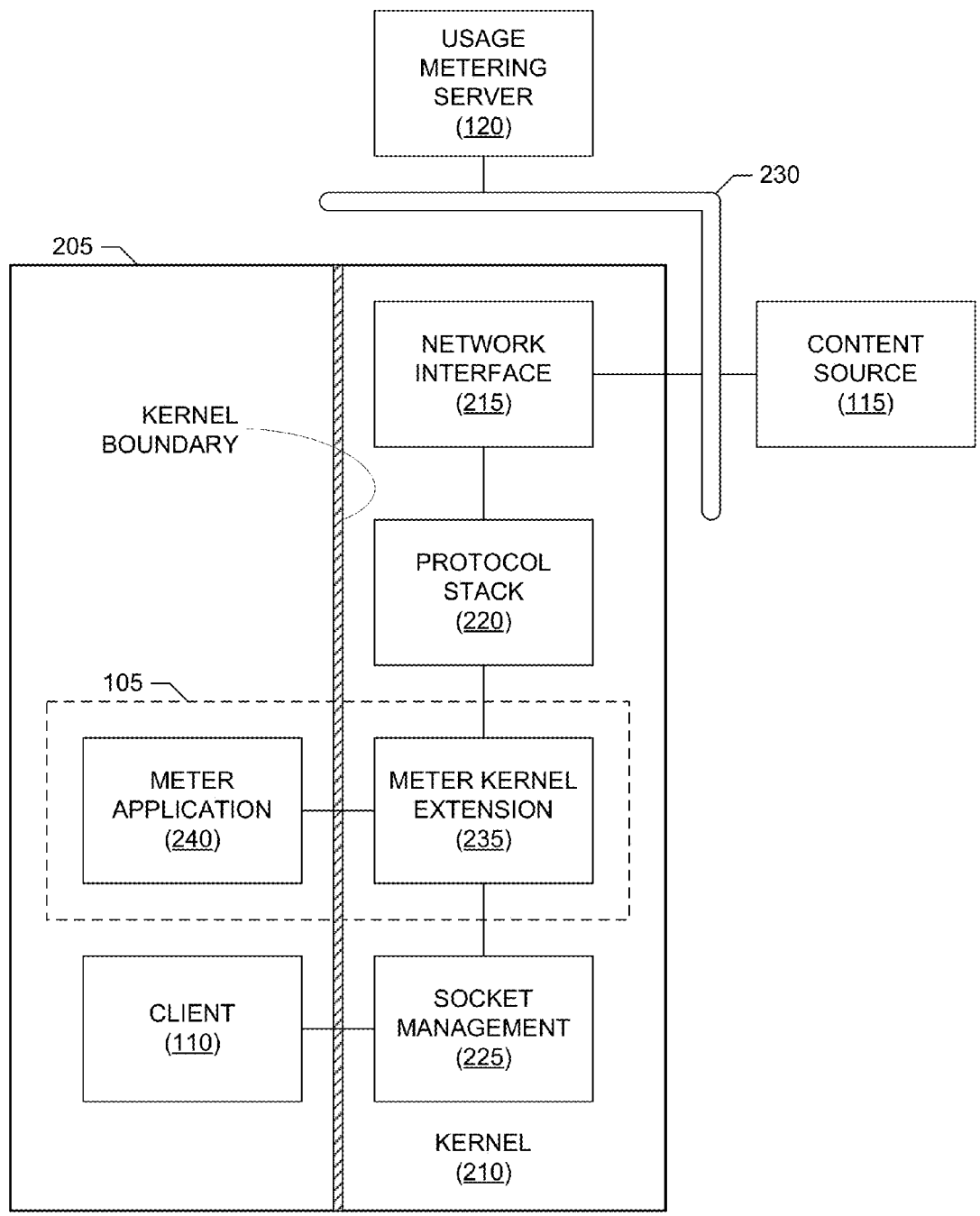
FIG. 2 is a block diagram illustrating a first example implementation of the example meter of FIG. 1.

A block diagram illustrating a first example implementation of the meter 105 of FIG. 1 is provided in FIG. 2. Like elements in FIGS. 1 and 2 are labeled with the same reference numerals. The detailed descriptions of these like elements are provided above in connection with the discussion of FIG. 1 and, in the interest of brevity, are not repeated in the discussion of FIG. 2

In the illustrated example of FIG. 2, the meter 105 is implemented for use in monitoring a client, such as the client 110, that corresponds to a client application executing on an example client device 205. The example client device 205 of FIG. 2 includes any type of operating system (OS) and, in particular, includes an example OS kernel 210 in which OS components are executed to support operation of the device 205 and to support execution of applications on the device, such as the client application 110. For example, the device 205 of FIG. 2 includes an example network interface kernel component 215, an example protocol stack kernel component 220 and an example socket management kernel component 225. In the illustrated example, the network interface kernel component 215 interfaces with a network interface, card, adapter, etc., of the client device 205 to enable the device 204 to communicate with one or more networks, such as an example network 230. The protocol stack kernel component 215 implements any type(s) and number of protocol stacks, such as protocol stack(s) supporting transmission control protocol/Internet protocol (TCP/IP), user datagram protocol (UDP), point-to-point protocol (PPP), serial line Internet protocol (SLIP), etc., to enable data to be communicated via the network 230. As such, the network 230 can correspond to any type of digital network, such as the Internet in the illustrated example. The socket management kernel component 225 is included in the OS kernel 210 to assign network sockets to applications executing on the client device 205. The network sockets are assigned by the socket management kernel component 225 using any appropriate technique and are used to identify (e.g., address) network traffic for a particular application, such as the client application 110.

In the illustrated example of FIG. 2, the meter 105 includes an example meter kernel extension 235 and an example meter application 240. The meter kernel extension 235 is executed in the OS kernel 210 of the client device 205, whereas the meter application 240 is an application that executes on the client device 205. In some examples, the meter kernel extension 235 is positioned between the protocol stack kernel component 215 and the socket management kernel component 225 as shown to intercept messages/traffic associated with the client application 110 by intercepting any message/traffic sent from/to the socket(s) assigned to the client application 110. In other words, the meter kernel extension 235 can use the socket(s) assigned to the client application 110 to identify the messages/traffic to be intercepted for use in monitoring Internet usage associated with the client application 110. For example, the meter kernel extension 235 may intercept the GET request in the operation 130 of FIG. 1, intercept the source's digital certificate received from the content source 115 in the operation 145 of FIG. 1 (e.g., to prevent the source's digital certificate from being returned to the client 110), intercept the reply message (containing the session key) in the operation 150 of FIG. 1, and intercept the traffic sent by or to the client 110 in blocks 165-170 of FIG. 1.

In some examples, to reduce the processing overhead added by the meter 105 in the OS kernel 210, the bulk of the meter processing is performed by the meter application 240, which executes in the application space of the client device 205. In such examples, after intercepting data sent from or to the client application 110, the meter kernel extension 235 may provide the intercepted data to the meter application 240 for subsequent processing. For example, the meter application 240 may process the first GET request intercepted by the meter kernel extension 235 in the operation 130 of FIG. 1 and: (1) implement the operation 135 of FIG. 1 to return the meter's digital certificate to the client application 110; (2) implement the operation 140 of FIG. 1 to send (e.g., forward) the second GET request to the content source 115; and (3) implement the operation 145 of FIG. 1 to store the source's digital certificate received from the content source 115. Additionally or alternatively, the meter application 240 may process the reply message intercepted by the meter kernel extension 235 in the operation 150 of FIG. 1 and: (1) implement the operation 155 of FIG. 1 to decrypt and obtain the session key provided by the client application 110; and (2) implement the operations 155 and 160 of FIG. 1 to re-encrypt and send the session key to the content source 115. Additionally or alternatively, the meter application 240 may implement the operation 175 of FIG. 1 to obtain and decrypt a copy of the encrypted traffic intercepted by the meter kernel extension 235. In some examples, the meter application 240 implements the operation 180 of FIG. 1 to report the decrypted network traffic and/or results of processing the decrypted network traffic to the usage metering server 120 via, for example, the network 230.

Figure 3:
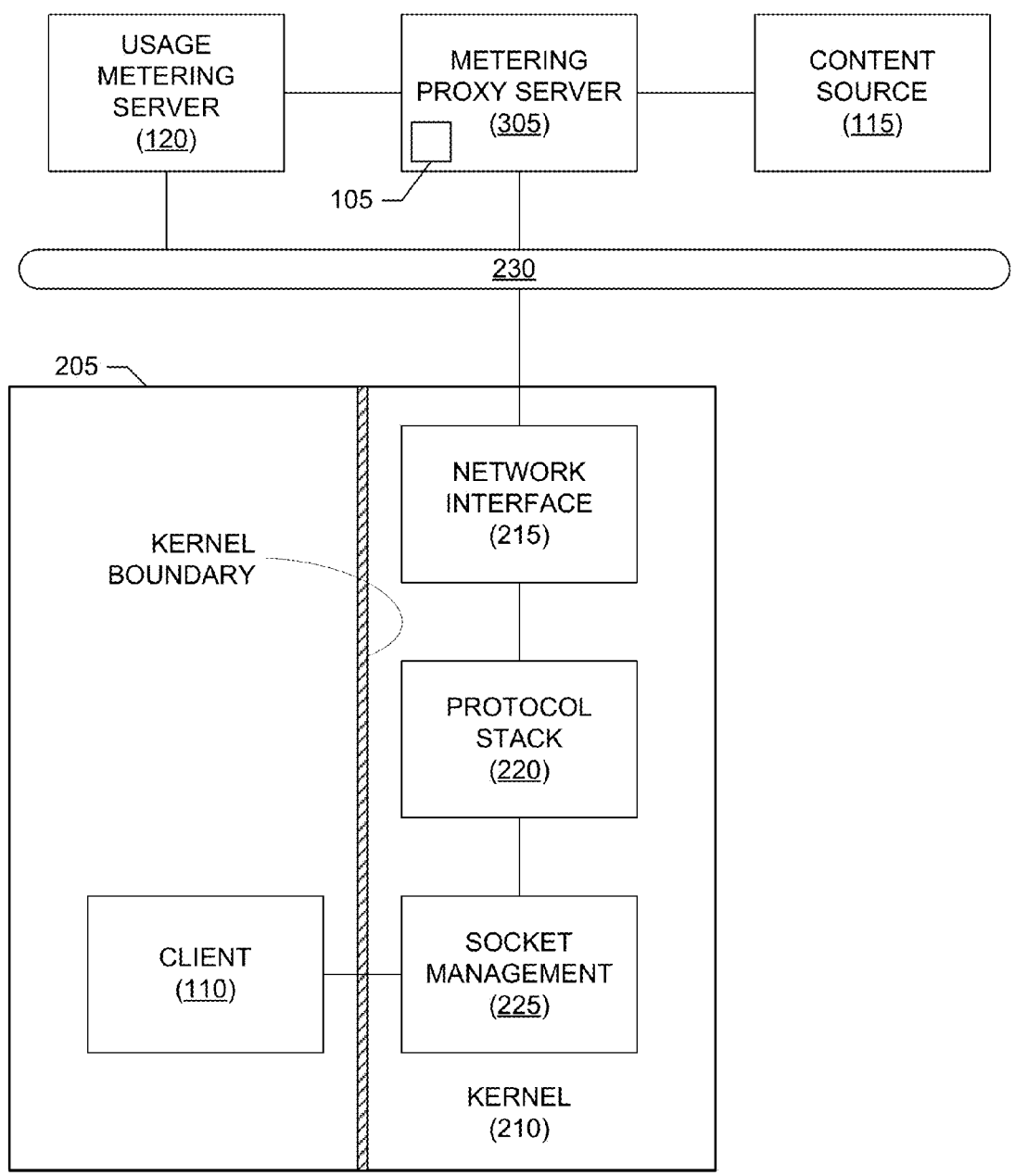
FIG. 3 is a block diagram illustrating a second example implementation of the example meter of FIG. 1.

A block diagram illustrating a second example implementation of the meter 105 of FIG. 1 is provided in FIG. 3. Like elements in FIGS. 1, 2 and 3 are labeled with the same reference numerals. The detailed descriptions of these like elements are provided above in connection with the discussions of FIGS. 1-2 and, in the interest of brevity, are not repeated in the discussion of FIG. 3.

In the illustrated example of FIG. 3, the meter 105 is implemented in an example metering proxy server 305. The metering proxy server 305 may be implemented by any type(s) or number of proxy server(s). In the illustrated example of FIG. 3, the client device 205 and/or client application 110 to be monitored by the meter 105 is/are configured to route (e.g., send and receive) network communications through the metering proxy server 305. As such, the metering proxy server 305 acts as an intermediary for exchanging messages/traffic between the client application 110 and the content source 115. For example, encrypted network traffic, such as HTTPS traffic, and unencrypted network traffic, such as HTTP traffic, exchanged between the client application 110 and the content source 115 flow through the metering proxy server 305 in the illustrated example of FIG. 3.

Because the messages/traffic exchanged between the client application 110 and the content source 115 flows through the metering proxy server 305, the meter 105 included in the metering proxy server 305 can intercept these messages/traffic to perform Internet usage metering of the client 110, as described above. For example, the meter 105 of FIG. 3 may intercept, process and re-send the GET request in accordance with the operations 130-145 of FIG. 1 because the client 110 will send the GET request to the metering proxy server 305 for proxy forwarding to the content source 115. Additionally or alternatively, the meter 105 of FIG. 3 may intercept, process and re-send the reply message containing the session key in accordance with the operations 150-160 of FIG. 1 because the client 110 will send the reply message to the metering proxy server 305 for proxy forwarding to the content source 115. Additionally or alternatively, the meter 105 of FIG. 3 may intercept and monitor encrypted network traffic between the client 110 and the content source 115 in accordance with the operations 175-180 of FIG. 1 because the encrypted network traffic exchanged between the client 110 and the content source 115 will flow through the metering proxy server 305.

Figure 4:
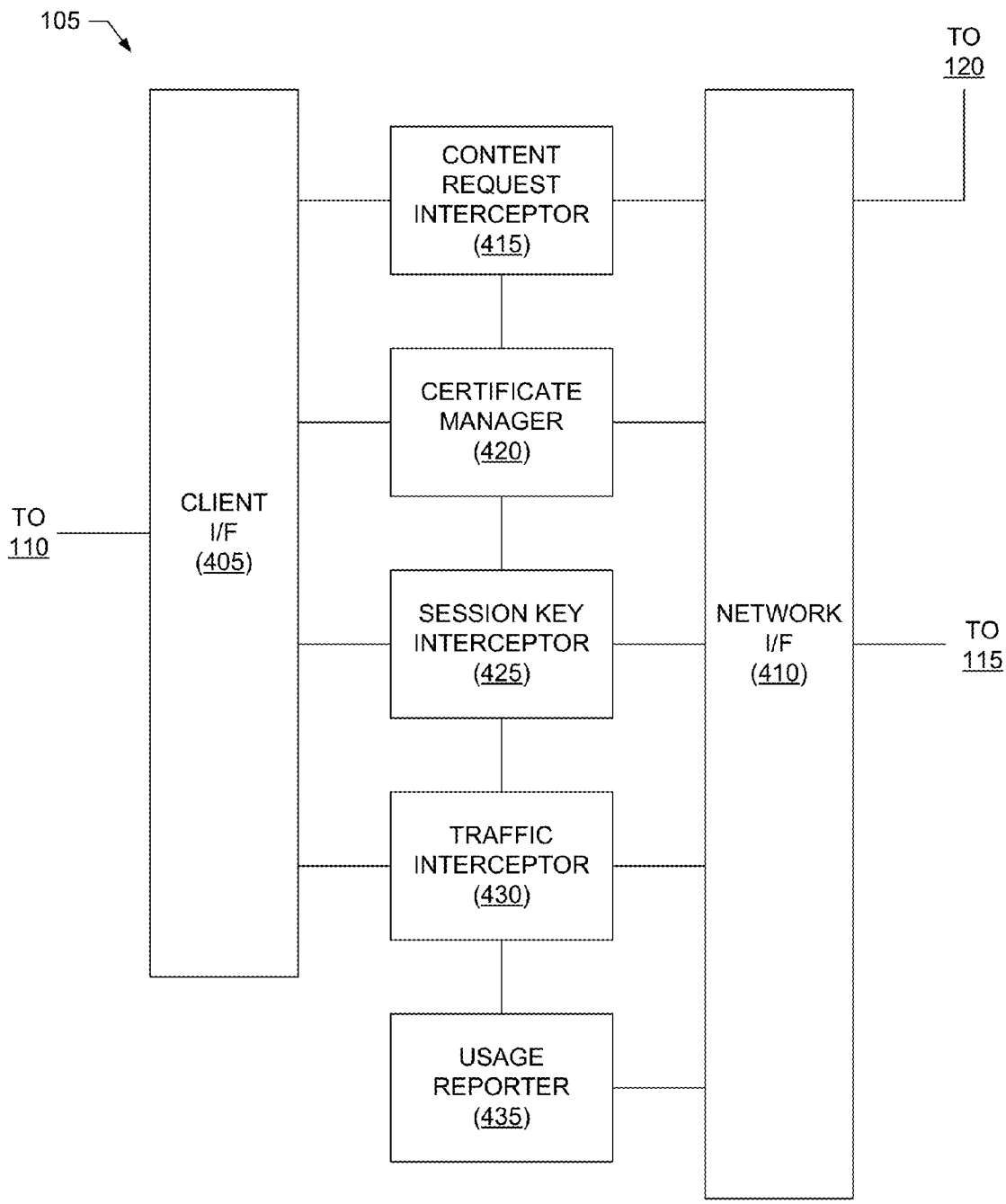
FIG. 4 is a block diagram illustrating a third example implementation of the example meter of FIG. 1.

A block diagram illustrating a third example implementation of the meter 105 of FIG. 1 is provided in FIG. 4. The example meter 105 of FIG. 4 includes an example client interface 405 that implements an interface between the meter 105 and the monitored client 110. For example, with reference to FIG. 2, the meter kernel extension 235 can implement the client interface 405 as an interface between the socket management kernel element 225 and the protocol stack 220 to intercept traffic received from or provided to the socket assigned to the client application 110. With reference to FIG. 3, the client interface 405 can correspond to a network interface of the metering proxy server 305 that is configured to receive traffic from and send traffic to the client 110. The example meter 105 of FIG. 4 also includes an example network interface 410 that implements an interface between the meter 105 and the network 230. For example, with reference to FIG. 2, the meter application 240 can implement the network interface 410 to send data to and/or process data received from the content source 115 and/or the usage metering server 120 via the network 230. With reference to FIG. 3, the network interface 410 can correspond to a network interface of the metering proxy server 305 that is configured to receive traffic from and send traffic to the content source 115 and/or the usage metering server 120.

The example meter 105 of FIG. 4 further includes an example content request interceptor 415, an example certificate manager 420, an example session key interceptor 425, an example traffic interceptor 430 and an example usage reporter 435 to intercept encrypted network traffic for Internet usage monitoring as described above. In some examples, one or more of the content request interceptor 415, the certificate manager 420, the session key interceptor 425, the traffic interceptor 430 and the usage reporter 435 can be implemented by the meter kernel extension 235 and/or the meter application 240 of FIG. 1. In some examples, one or more of the content request interceptor 415, the certificate manager 420, the session key interceptor 425, the traffic interceptor 430 and the usage reporter 435 can be implemented by the metering proxy server 305 of FIG. 3.

In the illustrated example of FIG. 4, the content request interceptor 415 performs the operations 130 and 140 of FIG. 1 to intercept the GET request sent by the monitored client 100 to the content source 140. With reference to FIG. 2, in some examples, the meter kernel extension 235 implements at least a portion of the content request interceptor 415 to intercept the GET request from the client 110 and intercept the source's digital certificate received from the content source 115, and the meter application 240 implements at least a portion of the content request interceptor 415 to process the GET request and then send (e.g., re-send/forward) the GET request on to the content source 115.

In the illustrated example of FIG. 4, the certificate manager 420 performs the operation 135 of FIG. 1 to provide the meter's digital certificate to the client 110 in response to the GET request from the monitored client 110 being intercepted by the content request interceptor 415. The certificate manager 420 of the illustrated example also performs the operation 145 of FIG. 1 to receive and store the source's digital certificate intercepted from the content source 115 in response to the content request interceptor 415 having forwarded the GET request, which was intercepted from the client 110, to the content source 115. With reference to FIG. 2, in some examples, the meter application 240 implements the certificate manager 420 to provide the meter's digital certificate to the client 110 in response to the interception of the GET request by the content request interceptor 415. In such examples, the certificate manager 420 implemented by the meter application 240 also stores the source's digital certificate received from the content source 115.

In the illustrated example of FIG. 4, the session key interceptor 425 performs the operations 150-160 of FIG. 1 to obtain a session key to enable decryption of the encrypted traffic to be exchanged between the content source 115 and the client 110 to enable monitoring of Internet usage associated with the client 110. As described above, the session key interceptor 425 is able to obtain and decrypt the session key from a reply message sent by the client 110 to the content source because the session key included in the reply message is encrypted by the client based on the meter's digital certificate. As also described above, the session key interceptor 425 sends the session key on to the content source 115 after re-encrypting the session key based on the source's digital certificate. With reference to FIG. 2, in some examples, the meter kernel extension 235 implements at least a portion of the session key interceptor 425 to intercept the reply message containing the session key sent from the client 110 to the content source 115. In such examples, the meter application 240 implements at least a portion of the session key interceptor 425 to: (1) decrypt the session key using the meter's private key, which is associated with the meter's public key included in the meter's digital certificate; (2) encrypt the session key using the source' public key that is included in the source's digital certificate; and (3) send the session key, which is now encrypted using the source's public key, to the content source 115 to establish a secure communication session between the content source 115 and the client 110.

In the illustrated example of FIG. 4, the traffic interceptor 430 performs the operation 175 of FIG. 1 to intercept, copy and process the encrypted network traffic exchanged between the monitored client 110 and the content source 115. With reference to FIG. 2, in some examples, the meter kernel extension 235 implements at least a portion of the traffic interceptor 430 to: (1) intercept received network traffic that is being sent from the content source 115 to the monitored client 110; and/or (2) intercept sent network traffic that is being sent from the monitored client 110 to the content source 115. In such examples, the meter application 240 implements at least a portion of the traffic interceptor 430 to: (1) decrypt the received encrypted traffic using the session key to obtain decrypted received network traffic; and/or (2) decrypt the sent encrypted traffic using the session key to obtain the decrypted sent network traffic.

In the illustrated example of FIG. 4, the usage reporter 435 performs the operation 180 of FIG. 1 to report, to the usage metering server 120, the decrypted network traffic and/or results of processing the decrypted network traffic exchanged between the monitored client 110 and the content source 115. With reference to FIG. 2, in some examples, the meter application 240 implements the usage reporter 435 to: (1) process the decrypted received network traffic and/or the decrypted sent network traffic associated with the monitored client; (2) format the results of processing the decrypted traffic; and (2) send the results to the usage metering server 120.

While an example manner of implementing the meter 105 of FIG. 1 has been illustrated in FIGS. 2-4, one or more of the elements, processes and/or devices illustrated in FIGS. 1-4 may be combined, divided, re-arranged, omitted, eliminated and/or implemented in any other way. Further, the example meter kernel extension 235, the example meter application 240, the example client interface 405, the example network interface 410, the example content request interceptor 415, the example certificate manager 420, the example session key interceptor 425, the example traffic interceptor 430, the example usage reporter 435 and/or, more generally, the example meter 105 of FIGS. 1-4 may be implemented by hardware, software, firmware and/or any combination of hardware, software and/or firmware. Thus, for example, any of the example meter kernel extension 235, the example meter application 240, the example client interface 405, the example network interface 410, the example content request interceptor 415, the example certificate manager 420, the example session key interceptor 425, the example traffic interceptor 430, the example usage reporter 435 and/or, more generally, the example meter 105 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example meter 105, the example meter kernel extension 235, the example meter application 240, the example client interface 405, the example network interface 410, the example content request interceptor 415, the example certificate manager 420, the example session key interceptor 425, the example traffic interceptor 430 and/or the example usage reporter 435 are hereby expressly defined to include a tangible computer readable medium such as a memory, digital versatile disk (DVD), compact disk (CD), Blu-ray Disc™, etc., storing such software and/or firmware. Further still, the example meter 105 of FIGS. 1-4 may include one or more elements, processes and/or devices in addition to, or instead of, those illustrated in FIGS. 1-4, and/or may include more than one of any or all of the illustrated elements, processes and devices.

Figure 5:
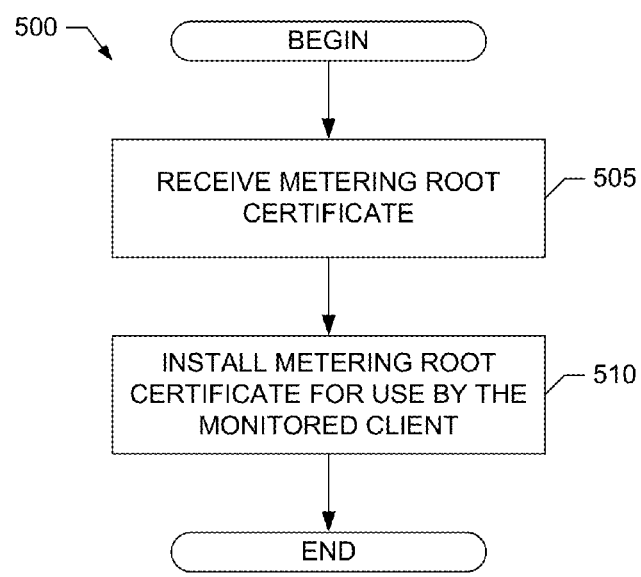
FIG. 5 is a flowchart representative of example machine readable instructions that may be executed to install a root certificate to enable Internet usage monitoring by the example meters of FIGS. 1-3 and/or 4.
Figure 6:
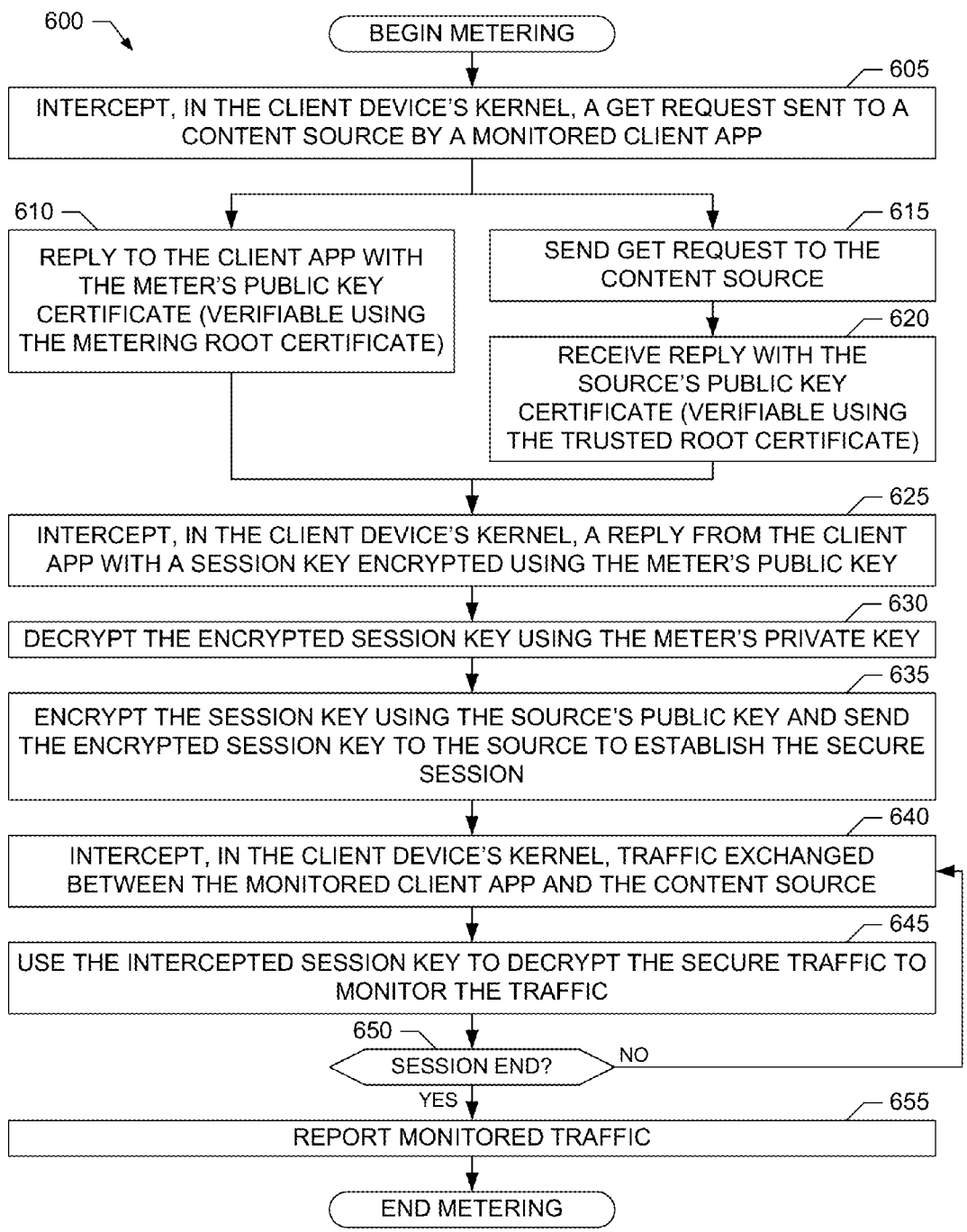
FIG. 6 is a flowchart representative of example machine readable instructions that may be executed to implement the example meters of FIGS. 1, 2 and/or 4.
Figure 7:
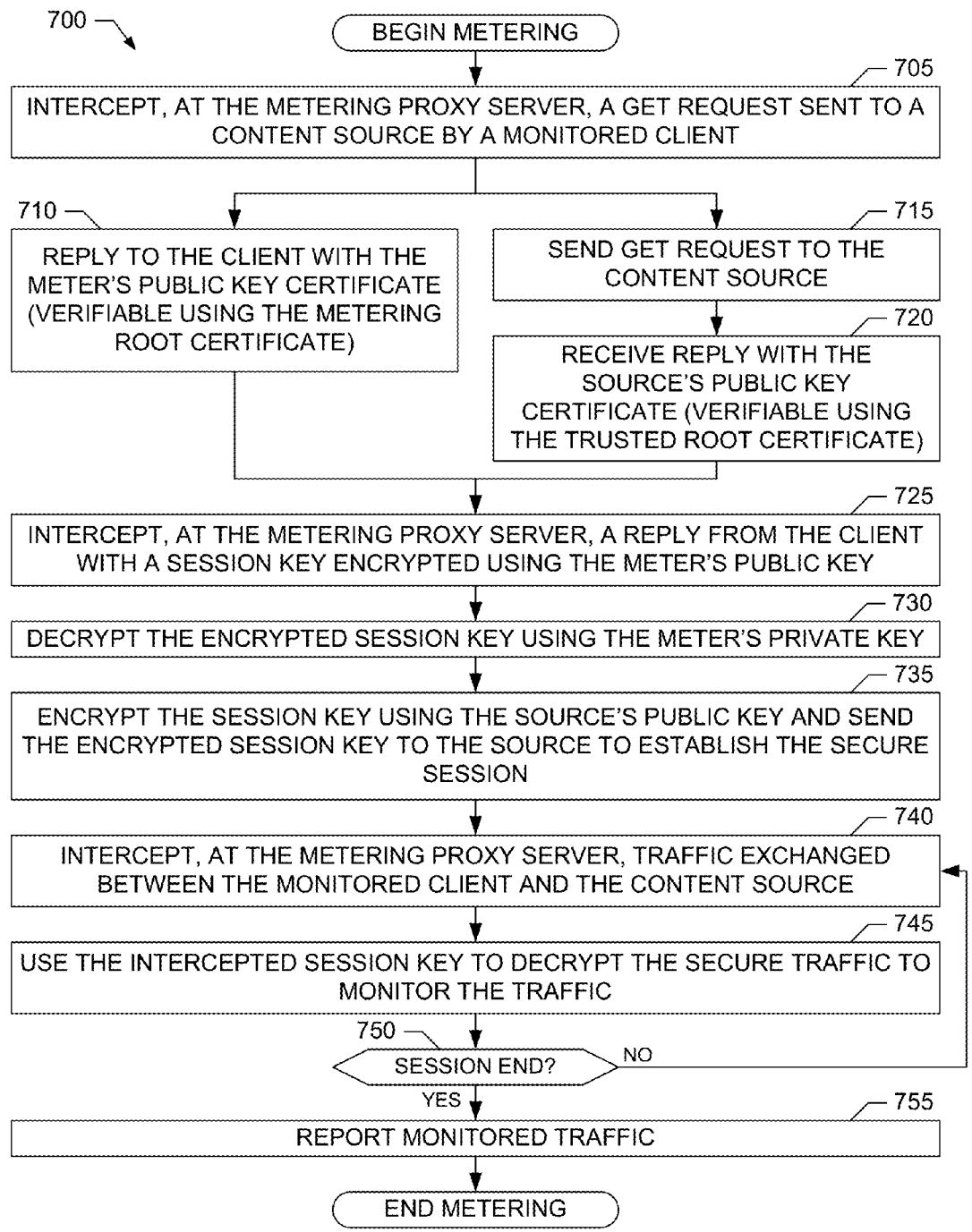
FIG. 7 is a flowchart representative of example machine readable instructions that may be executed to implement the example meters of FIGS. 1, 3 and/or 4.

Flowcharts representative of example machine readable instructions for implementing the example meter 105, the example meter kernel extension 235, the example meter application 240, the example client interface 405, the example network interface 410, the example content request interceptor 415, the example certificate manager 420, the example session key interceptor 425, the example traffic interceptor 430 and/or the example usage reporter 435 are shown in FIGS. 5-7. In these examples, the machine readable instructions represented by each flowchart may comprise one or more programs for execution by a processor, such as the processor 812 shown in the example processing system 800 discussed below in connection with FIG. 8. The one or more programs, or portion(s) thereof, may be embodied in software stored on a tangible computer readable medium such as a CD-ROM, a floppy disk, a hard drive, a digital versatile disk (DVD), a Blu-ray Disc™, or a memory associated with the processor 812, but the entire program or programs and/or portions thereof could alternatively be executed by a device other than the processor 812 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 5-7 may be implemented manually. Further, although the example machine readable instructions are described with reference to the flowcharts illustrated in FIGS. 5-7, many other methods of implementing the example meter 105, the example meter kernel extension 235, the example meter application 240, the example client interface 405, the example network interface 410, the example content request interceptor 415, the example certificate manager 420, the example session key interceptor 425, the example traffic interceptor 430 and/or the example usage reporter 435 may alternatively be used. For example, with reference to the flowcharts illustrated in FIGS. 5-7, the order of execution of the blocks may be changed, and/or some of the blocks described may be changed, eliminated, combined and/or subdivided into multiple blocks.

As mentioned above, the example processes of FIGS. 5-7 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 5-7 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Example machine readable instructions 500 that may be executed to perform the initialization operation 125 of FIG. 1 to install a root digital certificate to enable Internet usage monitoring by the example meter 105 of FIGS. 1-3 and/or 4 are represented by the flowchart shown in FIG. 5. With reference to the preceding figures and corresponding descriptions, the example machine readable instructions 500 of FIG. 5 begin execution at block 505 at which the client 110 or a device, such as the client device 205, executing the client 110 receives a metering root certificate from the usage metering server 120 (or another server or download mechanism associated with the monitoring entity). The metering root certificate is a root digital certificate that will be used to authenticate a digital certificate that is to be provided, during a later operating stage, by the meter 105. At block 510, the received metering root certificate is installed for later use by the client 110. For example, at block 510, the metering root certificate may be installed on the OS of the client 110 (e.g., when the client 110 corresponds to a client device), or on an OS of the client device 205 executing the client 110 (e.g., when the client 110 corresponds to a particular application executing on the device 205), using any root certificate installation mechanism. Execution of the example machine readable instructions 500 then ends.

Example machine readable instructions 600 that may be executed to implement the example meter 105 of FIGS. 1, 2 and/or 4 are represented by the flowchart shown in FIG. 6. With reference to the preceding figures and corresponding descriptions, the example machine readable instructions 600 of FIG. 6 begin execution at block 605 at which the content request interceptor 415 (e.g., the portion of which that is implemented in the meter 105 by the meter kernel extension 235) performs the operation 130 of FIG. 1, as described above, to intercept a GET request sent by the monitored client 110 to the content source 115 to request establishment of a secure HTTPS session via which encrypted data is to be exchanged.

At block 610, the certificate manager 420, (e.g., which is implemented in the meter 105 by the meter application 240) performs the operation 135 of FIG. 1 to provide the meter's digital certificate to the client 110 in response to the GET request intercepted at block 605. At block 615, the content request interceptor 415 (e.g., the portion of which that is implemented in the meter 105 by the meter application 240) performs the operation 140 of FIG. 1, as described above, to process the first GET request and then, in response to the first GET request intercepted at block 605, send (e.g., re-send/forward) the second GET request on to the content source 115 and wait to intercept the source's digital certificate returned by the content source 115. At block 620, the certificate manager 420 (e.g., which is implemented in the meter 105 by the meter application 240) performs the operation 145 of FIG. 1 to obtain and store the source's digital certificate received (e.g., intercepted) from the content source 115 in response to the GET request having been forwarded to the content source 115 at block 620.

At block 625, the session key interceptor 425 (e.g., the portion of which that is implemented in the meter 105 by the meter kernel extension 235) performs the operation 150 of FIG. 1, as described above, to intercept a reply message sent from the monitored client 110 to the content source 115 that contains a session key encrypted using the public key included in the meter's digital certificate. At block 630, the session key interceptor 425 (e.g., the portion of which that is implemented in the meter 105 by the meter application 240) performs the operation 155 of FIG. 1, as described above, to: (1) decrypt the session key using the meter's private key that is paired with the public key included in the meter's digital certificate that was sent to the client 110 at block 610; and (2) re-encrypt the decrypted session key using the public key included in the source's digital certificate that was received at block 620. At block 635, the session key interceptor 425 (e.g., the portion of which that is implemented in the meter 105 by the meter application 240) performs the operation 160 of FIG. 1, as described above, to send the re-encrypted key to the content source 115 to establish a secure communication session between the content source 115 and the client 110, but which the monitor 105 can monitor as it also knows the session key.

At block 640, the traffic interceptor 430 (e.g., the portion of which that is implemented in the meter 105 by the meter kernel extension 235) performs a first portion of the operation 175 of FIG. 1, as described above, to intercept and copy the encrypted network traffic exchanged between the monitored client 110 and the content source 115. At block 645, the traffic interceptor 430 (e.g., the portion of which that is implemented in the meter 105 by the meter application 240) performs a second portion of the operation 175 of FIG. 1, as described above, to decrypt the encrypted network traffic that was intercepted at block 640. The monitor 105 continues performing the processing at blocks 640 and 645 until the monitor 105 detects that the communication session between the client 110 and the content source 115 has ended (see block 650). At block 655, the usage reporter 435 (e.g., which is implemented in the meter 105 by the meter application 240) performs the operation 180 of FIG. 1, as described above, to process the decrypted network traffic obtained at block 645 and report the monitored traffic and/or results of processing (e.g., summarizing) the monitored traffic to the usage metering server 120.

Example machine readable instructions 700 that may be executed to implement the example meter 105 of FIGS. 1, 3 and/or 4 are represented by the flowchart shown in FIG. 7. With reference to the preceding figures and corresponding descriptions, the example machine readable instructions 700 of FIG. 7 begin execution at block 705 at which the content request interceptor 415 (e.g., which is included in the meter 105 that is implemented in the metering proxy server 305) performs the operation 130 of FIG. 1, as described above, to intercept a GET request sent by the monitored client 110 via the metering proxy server 305 to the content source 115 to request establishment of a secure HTTPS session via which encrypted data is to be exchanged.

At block 710, the certificate manager 420, (e.g., which is included in the meter 105 that is implemented in the metering proxy server 305) performs the operation 135 of FIG. 1 to provide the meter's digital certificate to the client 110 in response to the first GET request intercepted at block 705. At block 715, the content request interceptor 415 performs the operation 140 of FIG. 1, as described above, to process the first GET request and then, in response to the first GET request intercepted at block 705, send (e.g., re-send/forward) the second GET request on to the content source 115 and wait to intercept the source's digital certificate returned by the content source 115. At block 720, the certificate manager 420 performs the operation 145 of FIG. 1 to obtain and store the source's digital certificate received (e.g., intercepted) from the content source 115 in response to the GET request having been forwarded to the content source 115 at block 720.

At block 725, the session key interceptor 425 (e.g., which is included in the meter 105 that is implemented in the metering proxy server 305) performs the operation 150 of FIG. 1, as described above, to intercept a reply message sent from the monitored client 110 via the metering proxy server 305 to the content source 115 that contains a session key encrypted using the public key included in the meter's digital certificate. At block 730, the session key interceptor 425 performs the operation 155 of FIG. 1, as described above, to: (1) decrypt the session key using the meter's private key that is paired with the public key included in the meter's digital certificate that was sent to the client 110 at block 710; and (2) re-encrypt the decrypted session key using the public key included in the source's digital certificate that was received at block 720. At block 735, the session key interceptor 425 performs the operation 160 of FIG. 1, as described above, to send the re-encrypted key to the content source 115 to establish a secure communication session between the content source 115 and the client 110, but which the monitor 105 can monitor as it also knows the session key.

At block 740, the traffic interceptor 430 (e.g., which is included in the meter 105 that is implemented in the metering proxy server 305) performs a first portion of the operation 175 of FIG. 1, as described above, to intercept and copy the encrypted network traffic exchanged between the monitored client 110 and the content source 115. At block 745, the traffic interceptor 430 performs a second portion of the operation 175 of FIG. 1, as described above, to decrypt the encrypted network traffic that was intercepted at block 740. The monitor 105 continues performing the processing at blocks 740 and 745 until the monitor 105 detects that the communication session between the client 110 and the content source 115 has ended (see block 750). At block 755, the usage reporter 435 (e.g., which is included in the meter 105 that is implemented in the metering proxy server 305) performs the operation 180 of FIG. 1, as described above, to process the decrypted network traffic obtained at block 745 and report the monitored traffic and/or results of processing (e.g., summarizing) the monitored traffic to the usage metering server 120.

Figure 8:
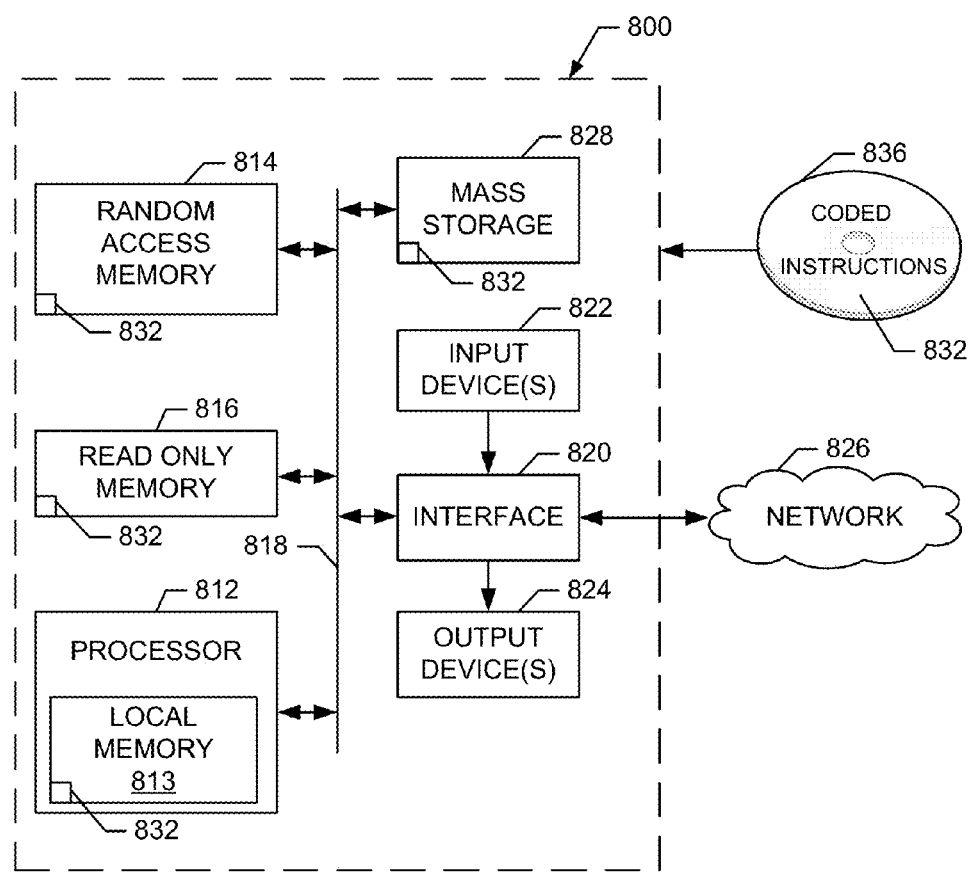
FIG. 8 is a block diagram of an example processing system that may execute the example machine readable instructions of FIGS. 5, 6 and/or 7 to implement the example meters of FIGS. 1-3 and/or 4, and/or support Internet usage monitoring in the example environment of FIG. 1.

FIG. 8 is a block diagram of an example processing system 800 capable of executing the instructions of FIGS. 5-7 to implement the example meter 105, the example meter kernel extension 235, the example meter application 240, the example client interface 405, the example network interface 410, the example content request interceptor 415, the example certificate manager 420, the example session key interceptor 425, the example traffic interceptor 430 and/or the example usage reporter 435 of FIGS. 1-4. The processing system 800 can be, for example, a server, a personal computer, a mobile phone (e.g., a smartphone, a cell phone, etc.), a personal digital assistant (PDA), an Internet appliance, a DVD player, a CD player, a digital video recorder, a Blu-ray player, a gaming console, a personal video recorder, a set top box or any other type of computing device.

The system 800 of the instant example includes a processor 812. For example, the processor 812 can be implemented by one or more microprocessors and/or controllers from any desired family or manufacturer.

The processor 812 includes a local memory 813 (e.g., a cache) and is in communication with a main memory including a volatile memory 814 and a non-volatile memory 816 via a bus 818. The volatile memory 814 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processing system 800 also includes an interface circuit 820. The interface circuit 820 may be implemented by any type of interface standard, such as an Ethernet interface, a universal serial bus (USB), and/or a PCI express interface.

One or more input devices 822 are connected to the interface circuit 820. The input device(s) 822 permit a user to enter data and commands into the processor 812. The input device(s) can be implemented by, for example, a keyboard, a mouse, a touchscreen, a track-pad, a trackball, a trackbar (such as an isopoint), a voice recognition system and/or any other human-machine interface.

One or more output devices 824 are also connected to the interface circuit 820. The output devices 824 can be implemented, for example, by display devices (e.g., a liquid crystal display, a cathode ray tube display (CRT)), a printer and/or speakers. The interface circuit 820, thus, typically includes a graphics driver card.

The interface circuit 820 also includes a communication device, such as a modem or network interface card, to facilitate exchange of data with external computers via a network 826 (e.g., an Ethernet connection, a digital subscriber line (DSL), a telephone line, coaxial cable, a cellular telephone system, etc.).

The processing system 800 also includes one or more mass storage devices 828 for storing machine readable instructions and data. Examples of such mass storage devices 828 include floppy disk drives, hard drive disks, compact disk drives and digital versatile disk (DVD) drives.

Coded instructions 832 corresponding to the instructions of FIGS. 5-7 may be stored in the mass storage device 828, in the volatile memory 814, in the non-volatile memory 816, in the local memory 813 and/or on a removable storage medium, such as a CD or DVD 836.

As an alternative to implementing the methods and/or apparatus described herein in a system such as the processing system of FIG. 8, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to monitor network traffic for a computing device, the method comprising:
    intercepting, with a meter executing on the computing device, a request sent by a client application executing on the computing device to establish a secure communication session with a network server, the meter including a kernel extension executing in an operating system kernel of the computing device;
    receiving, at the meter in response to forwarding the request to the network server, a first public key provided by the network server for encrypting a session key to be used to exchange network traffic via the secure communication session;
    providing, from the meter to the client application, a second public key associated with the meter instead of the first public key provided by the network server in response to the request being intercepted by the meter;

using the first public key and a private key associated with the second public key to exchange, via the meter, the session key between the client application and the network server to enable the meter to access an unencrypted version of the session key; and monitoring, with the meter, the network traffic exchanged between the client application and the network server via the secure communication session using the unencrypted version of the session key.

2. The method as defined in claim 1, wherein using the first public key and the private key associated with the second public key to exchange the session key between the client application and the network server includes:

intercepting, with the meter, a first encrypted version of the session key sent by the client application for receipt by the network server, the first encrypted version of the session key being encrypted using the second public key; and decrypting, with the meter, the first encrypted version of the session key using the private key associated with the second public key to obtain the unencrypted version of the session key.

3. The method as defined in claim 2, further including:

encrypting, at the meter, the unencrypted version of the session key using the first public key to determine a second encrypted version of the session key; and sending the second encrypted version of the session key to the network server.

4. The method as defined in claim 1, wherein monitoring the network traffic includes:

intercepting, at the meter, first encrypted network traffic sent from the client application to the network server;

decrypting the first encrypted network traffic using the unencrypted version of the session key to obtain first unencrypted network traffic; and reporting the first unencrypted network traffic to a metering server.

5. The method as defined in claim 4, further including:

intercepting, at the meter, second encrypted network traffic sent from the network server to the client application;

decrypting the second encrypted network traffic using the unencrypted version of the session key to obtain second unencrypted network traffic; and reporting the second unencrypted network traffic to the metering server.

6. The method as defined in claim 1, wherein the second public key is included in a digital certificate installed on the computing device prior to the request being sent by the client.

7. A tangible computer readable medium comprising computer readable instructions which, when executed, cause a processor of a computing device to at least:

execute a kernel extension of a meter in an operating system kernel of the computing device, the meter, when executed by the processor, to at least:

intercept a request sent by a client application executing on the computing device to establish a secure communication session with a network server;

receive, in response to forwarding the request to the network server, a first public key provided by the network server for encrypting a session key to be used to exchange network traffic via the secure communication session;

provide, to the client application, a second public key associated with a meter instead of the first public key provided by the network server in response to the request being intercepted;

use the first public key and a private key associated with the second public key to exchange the session key between the client application and the network server to enable the meter to access an unencrypted version of the session key; and monitor the network traffic exchanged between the client application and the network server via the secure communication session using the unencrypted version of the session key.

8. The tangible computer readable medium as defined in claim 7, wherein to use the first public key and the private key associated with the second public key to exchange the session key between the client application and the network server, the instructions, when executed, further cause the processor to execute the meter to:

intercept a first encrypted version of the session key sent by the client application for receipt by the network server, the first encrypted version of the session key being encrypted using the second public key; and decrypt the first encrypted version of the session key using the private key associated with the second public key to obtain the unencrypted version of the session key.

9. The tangible computer readable medium as defined in claim 8, wherein the instructions, when executed, further cause the processor to execute the meter to:

encrypt the unencrypted version of the session key using the first public key to determine a second encrypted version of the session key; and send the second encrypted version of the session key to the network server.

10. The tangible computer readable medium as defined in claim 7, wherein to monitor the network traffic, the instructions, when executed, cause the processor to execute the meter to:

intercept first encrypted network traffic sent from the client application to the network server;

decrypt the first encrypted network traffic using the unencrypted version of the session key to obtain first unencrypted network traffic; and report the first unencrypted network traffic to a metering server.

11. The tangible computer readable medium as defined in claim 10, wherein the instructions, when executed, further cause the processor to execute the meter to:

intercept second encrypted network traffic sent from the network server to the client application;

decrypt the second encrypted network traffic using the unencrypted version of the session key to obtain second unencrypted network traffic; and report the second unencrypted network traffic to the metering server.

12. The tangible computer readable medium as defined in claim 7, wherein the second public key is included in a digital certificate installed on the computing device prior to the request being sent by the client.

13. A computing device comprising:

a meter having a kernel extension to execute in an operating system kernel of the computing device, the meter including:

a content request interceptor to intercept a request sent by a client application executing on the computing device to establish a secure communication session with a network server;

a certificate manager to:
  receive, in response to forwarding the request to the network server, a first public key provided by the network server for encrypting a session key to be used to exchange network traffic via the secure communication session;
  provide, to the client application, a second public key associated with the meter instead of the first public key provided by the network server in response to the request being intercepted;

a session key interceptor to use the first public key and a private key associated with the second public key to exchange the session key between the client application and the network server to enable the meter to access an unencrypted version of the session key; and a traffic interceptor to intercept the network traffic exchanged between the client application and the network server via the secure communication session using the unencrypted version of the session key.

14. The computing device as defined in claim 13, wherein the session key interceptor is further to:
  intercept a first encrypted version of the session key sent by the client application for receipt by the network server, the first encrypted version of the session key being encrypted using the second public key; and
  decrypt the first encrypted version of the session key using the private key associated with the second public key to obtain the unencrypted version of the session key.

15. The computing device as defined in claim 14, wherein the session key interceptor is further to:
  encrypt the unencrypted version of the session key using the first public key to determine a second encrypted version of the session key; and
  send the second encrypted version of the session key to the network server.

16. The computing device as defined in claim 13, wherein the traffic interceptor is further to:
  intercept first encrypted network traffic sent from the client application to the network server; and
  decrypt the first encrypted network traffic using the unencrypted version of the session key to obtain first unencrypted network traffic.

17. The computing device as defined in claim 16, wherein the traffic interceptor is further to:
  intercept second encrypted network traffic sent from the network server to the client application; and
  decrypt the second encrypted network traffic using the unencrypted version of the session key to obtain second unencrypted network traffic.

18. The computing device as defined in claim 17, wherein the meter further includes a usage reporter to:
  report the first unencrypted network traffic to a metering server; and
  report the second unencrypted network traffic to the metering server.

19. The computing device as defined in claim 13, wherein the second public key is included in a digital certificate installed on the computing device prior to the request being sent by the client.

* * * * *